(12) United States Patent
Huck et al.

(10) Patent No.: US 10,102,202 B2
(45) Date of Patent: Oct. 16, 2018

(54) SYSTEMS AND METHODS FOR INDEPENDENT COMPUTER PLATFORM LANGUAGE CONVERSION SERVICES

(71) Applicant: MasterCard International Incorporated, Purchase, NY (US)

(72) Inventors: Bridget Kay Huck, Wildwood, MO (US); Clifford O. Ravenscraft, Kirkwood, MO (US); Scott Joseph Pardo, St. Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 241 days.

(21) Appl. No.: 14/973,422

(22) Filed: Dec. 17, 2015

(65) Prior Publication Data

US 2017/0177566 A1    Jun. 22, 2017

(51) Int. Cl.
*G06F 17/21* (2006.01)
*G06F 17/28* (2006.01)
*G06F 17/27* (2006.01)
*G06F 17/22* (2006.01)
*G06F 17/24* (2006.01)

(52) U.S. Cl.
CPC ...... *G06F 17/2809* (2013.01); *G06F 17/2205* (2013.01); *G06F 17/2211* (2013.01); *G06F 17/277* (2013.01)

(58) Field of Classification Search
CPC .................................................. G06F 17/277
See application file for complete search history.

(56) References Cited

U.S. PATENT DOCUMENTS

| 5,148,541 | A | 9/1992 | Lee et al. |
| 5,678,039 | A * | 10/1997 | Hinks ................... G06F 9/4448 |
| 5,890,103 | A | 3/1999 | Carus |
| 6,138,086 | A * | 10/2000 | Rose .................. G06F 17/2205 |
| | | | 704/8 |
| 6,542,888 | B2 | 4/2003 | Marques |
| 7,536,293 | B2 | 5/2009 | Zhuo et al. |
| 7,711,571 | B2 | 5/2010 | Heiner et al. |
| 8,751,243 | B2 | 6/2014 | Heiner et al. |
| 8,761,513 | B1 | 6/2014 | Rogowski et al. |
| 8,862,456 | B2 * | 10/2014 | Krack ................... G06F 17/289 |
| | | | 704/2 |

(Continued)

*Primary Examiner* — James J Debrow
(74) *Attorney, Agent, or Firm* — Armstrong Teasdale LLP (57) ABSTRACT

A conversion management (CM) computing device is provided. The CM computing device includes a processor in communication with a memory. The processor is causes the CM computing device to receive, from an app developer device, a plurality of input locale identifiers and an input text string, convert the input text string into at an input text token, compare the input locale identifiers and the input text token to a localization table that includes a plurality of entries. Each entry includes a stored text token, a stored locale identifier, and a translated text string. The processor further causes the CM computing device to identify a matching entry included within the localization table for the input locale identifiers. The matching entry includes a stored locale identifier matching one of the input locale identifiers, a stored text token matching the text token, and an associated translated text string.

20 Claims, 6 Drawing Sheets

(56) References Cited

U.S. PATENT DOCUMENTS

| | | |
|---|---|---|
| 8,965,129 B2 | 2/2015 | Rogowski et al. |
| 2003/0154069 A1 | 8/2003 | Carew et al. |
| 2003/0179225 A1* | 9/2003 | Nettles ................ G06F 9/4448 |
| | | 715/703 |
| 2005/0080797 A1* | 4/2005 | Short ............... G06F 17/30731 |
| 2007/0136470 A1 | 6/2007 | Chikkareddy et al. |
| 2008/0077384 A1 | 3/2008 | Agapi et al. |
| 2014/0075513 A1* | 3/2014 | Trammel ............. H04L 9/3213 |
| | | 726/4 |
| 2015/0154181 A1 | 6/2015 | Dmytryshyn |
| 2015/0199337 A1 | 7/2015 | Park et al. |
| 2015/0199338 A1 | 7/2015 | Freiberg et al. |

* cited by examiner

SYSTEMS AND METHODS FOR INDEPENDENT COMPUTER PLATFORM LANGUAGE CONVERSION SERVICES

BACKGROUND

The systems and methods described herein relate generally to language conversion services within a computer environment and, more specifically, to network-based systems and methods for providing independent computing platform language conversion services.

Software applications or apps may enable end users (e.g., consumers, players, developers, merchants, and other users) to view and analyze a variety of information. In some cases, that information may include financial information such as transaction data. Developing software apps for international and multicultural end users present certain difficulties for app developers. For example, an app developer in the United States may add text (also referred to as a "string" or "text string") to a user interface of the app such as a greeting, chart labels, and/or instructions in English. However, an end user in Russia may not be able to read the English text and may find the information displayed by the app difficult to understand. To address this issue, the U.S.-based app developer may have to translate the English text to Russian to enable the Russian end user to understand the information presented within the app. In some known systems, the U.S.-based app developer may translate the English text manually or with a machine translation service.

However, translating text manually or with a machine translation service may result in errors in the translation. In addition, some translated text may have alternative translations that may be better understood by end users. An app developer, such as the U.S.-based app developer, can hire a professional translator to translate the text, but the cost of translators for multiple languages may be cost prohibitive. In addition, if there are multiple apps being developed by a single company that require translations, some translations performed for one app may be usable by another app. However, the app developers for the one app may not know about or have access to the already completed translations that may be usable within their apps. Redundant translations and an inability to locate already performed and relevant translations may cost a company and/or app development teams additional time and money.

BRIEF DESCRIPTION

In one aspect, conversion management (CM) computing device is provided. The CM computing device includes a processor in communication with a memory. The processor causes the CM computing device to receive, from an app developer device, a plurality of input locale identifiers and an input text string, convert the input text string into at an input text token, compare the input locale identifiers and the input text token to a localization table that includes a plurality of entries. Each entry includes a stored text token, a stored locale identifier, and a translated text string. The processor further causes the CM computing device to identify a matching entry included within the localization table for the input locale identifiers. The matching entry includes a stored locale identifier matching one of the input locale identifiers, a stored text token matching the text token, and an associated translated text string.

In another aspect, a computer-implemented method for identifying translated text strings is provided. The method is implemented by a CM computing device in communication with a memory. The method includes receiving, from an app developer device, a plurality of input locale identifiers and an input text string, converting the input text string into an input text token, comparing the input locale identifiers and the input text token to a localization table, the localization table including a plurality of entries, and identifying a matching entry for the input locale identifiers included within the localization table. Each entry includes a stored text token, a stored locale identifier, and a translated text string. The matching entry includes a stored text token matching the input text token, a stored locale identifier matching one of the plurality of input locale identifiers, and an associated translated text string.

In yet another aspect, a computer-readable storage media for identifying a translated text string is provided. The computer-readable storage media has computer-executable instructions embodied thereon. When executed by a processor, the computer-executable instructions cause the processor to receive, from an app developer device, a plurality of input locale identifiers and an input text string, convert the input text string into an input text token, compare the input locale identifiers and the input text token to a localization table, and identify a matching entry included within the localization table. The localization table includes a plurality of entries. Each entry includes a stored text token, a stored locale identifier, and a translated text string. The matching entry includes a stored text token matching the text token, a stored locale identifier matching one of the plurality of input locale identifiers, and an associated translated text string.

DETAILED DESCRIPTION

The systems and methods described herein relate generally to language conversion services within a computer environment and, more specifically, to network-based systems and methods for providing independent computing platform conversion services.

The system described herein is configured to provide language conversion services to app developers during an app development stage. The system outputs translated text strings that are integrated into the app to provide automatic translations within the app for multiple languages. In particular, the system is configured to (i) receive one or more input text strings and locale information (e.g., country, language, culture, etc.), (ii) convert the input text strings to a searchable format, (iii) identify any stored translated text strings associated with the input text strings and the locale information, and (iv) transmit the translated text strings to the app for use by the app when the end user selects a locale. The system includes a conversion management (CM) computing device. The CM computing device includes a processor in communication with a memory. The CM computing device is in communication with at least one database for storing information, such as translated text strings, text tokens, and locale identifiers.

A text token is at least a portion of an input text string converted into a searchable format by the CM computing device for analysis. In some implementations, the text token is formatted as a text string (i.e., alphabetical or alphanumerical). In other implementations, the text token may be a numerical value. The text token may be associated with a text string and any translations of the text string stored in the database and/or the CM computing device. In some implementations, the text token may be an English translation of the input text string. In other implementations, the text token may be a different text string or a numerical value such as a Unicode, hexadecimal, or an encoded representation of at least a portion of the input text string. The CM computing device and/or the database may be configured to store a table of text tokens for converting the received text strings as described herein.

A locale identifier may include information to identify what translation is requested by the app such as, but not limited to, a language, a country, a sub-region (i.e., a state), and/or a culture. For example, Canada may include a locale identifier for English speakers (Canada-English) and another locale identifier for French speakers (Canada-French). Although some locale identifiers may include the same language, the translated text string may be different if the locales indicated by the locale identifiers use different words or phrases. For example, one locale may commonly use "Welcome!" as a greeting while another locale may use "Greetings!" for the same greeting.

As used herein, an "app developer device" is a computing device in communication with the CM computing device. The app developer device is associated with an app developer. The app developer device is used by the app developer to develop and maintain an app. The app may be, for example, a mobile application, a web site, and/or a computer application. The app developer device is configured to send input text strings to the CM computing device, and receive translated text strings from the CM computing device for use in the app.

The CM computing device is configured to (i) generate a localization table with at least one entry, wherein each entry includes a text token, a locale identifier, and a translated text string; (ii) receive, from an app developer device, a plurality of input locale identifiers and at least one input text string to be translated; (iii) convert the at least one input text string to at least one input text token; (iv) compare the plurality of input locale identifiers and the at least one input text token to the localization table; (v) identify a matching entry included within the localization table, wherein the matching entry includes a locale identifier matching one of the input locale identifiers, a text token matching one of the input text tokens, and an associated translated text string; and (vi) transmit the associated translated text string of the matching entry to the app developer device.

The CM computing device is configured to generate and store a localization table. The localization table is populated with entries that include a text token, a locale identifier, and a translated text string. The text token is associated with a text string that, when translated according to the locale identifier, produces the translated text string. For example, an entry with a text token representing the text string "Hello!" and a locale identifier "Mexico-Spanish" may further include a translated text string "¡Hola!". The CM computing device is configured to create, delete, and/or edit the entries of the localization table. The localization table is stored in the database or another memory associated with the CM computing device for analysis described herein.

The CM computing device may be configured with a setup phase for new apps. The setup phase enables an app developer to submit a plurality of locale identifiers and at least one input text string to the CM computing device to be translated. The CM computing device may store the translations of the input text string(s) such that, during subsequent interactions between the CM computing and the app (either on an app developer device or a user computing device), the app may request the stored translations.

The CM computing device receives, from an app developer device, a plurality of input locale identifiers and at least one input text string to be translated for use in an app. In some implementations, the app developer device further transmits at least one label identifier and/or an app identifier to the CM computing device. The label identifiers indicate a section or location of the app (e.g., page number, screen, title, label, text box, etc.) that includes the input text string. The app identifier enables the CM computing device to identify which app is associated with the plurality of input locale identifiers and the input text strings.

The CM computing device is configured to convert the input text strings into input text tokens. Text tokens enable the CM computing device to store the input text strings in a searchable, universal format. By using a universal format, the CM computing device may identify translated text strings stored in the localization table that are linked to the input text strings without knowledge of the language or locale of the translated text strings. For example, an input text string in English and a translated text string in Russian associated with the input text string will have the same text token, thus simplifying the process of identifying the translated text string as described herein. The CM computing device may compare the input text strings to a table of text tokens to identify an input text token associated with each input text string.

The CM computing device is configured to compare the plurality of input locale identifiers and the input text tokens to entries of the localization table. Specifically, the CM computing device compares each input text token and input locale identifier with text tokens and locale identifiers of the entries in the localization table. If an entry of the localization table includes both a text token and a locale identifier that matches an input text token and an input locale identifier, the entry (referred to as a "matching entry") may further include a translated text string that is associated with the input text token and the input locale identifier. The CM computing device may be configured to identify the matching entry. For example, an input text token representing an input text string "Welcome!" and input locale identifiers for English, French, and Spanish locales are compared to the localization table. The CM computing device determines if the input text token and the locale identifiers match the entries of the localization table. The CM computing device may identify two matching entries for the input text token and the English and Spanish input locale identifiers, respectively. The matching entries indicate the localization table may include translated text strings of the input text string "Welcome!" in English and Spanish.

If the CM computing device determines any of the plurality of input locale identifiers and/or the input text tokens do not match the entries of the localization table, it may indicate that the localization table does not include a translated text string for a requested input text string and locale. In the above example, the CM computing device may not locate a matching entry for the input text token and the French input locale identifier. As such, a translated text string of the input text string "Welcome!" in French may not be included in the localization table. The CM computing device may receive and/or retrieve translated text strings missing from the localization table. The CM computing device is configured to add entries to the localization table to store the translated text strings.

The CM computing device is also configured to generate a setup profile for the app including the translated text strings associated with the input text strings and the plurality of input locale identifiers. The setup profile enables the app developer device and/or a user computing device running the app to retrieve the translated text strings from the CM computing device without requiring the CM computing device to compare the input text strings and the input locale identifiers with the entries of the localization table each time. For apps that have a setup profile already generated, the app developer device may add more input text strings to be translated, edit the existing setup profile, and/or delete the translated text strings.

The CM computing device is further configured to transmit the translated text strings to the app developer device and/or the user computing device. The user computing device and the app developer device may retrieve the translated text strings from the CM computing device. Additionally or alternatively, the CM computing device may send the translated text strings periodically and/or in response to a request from the app developer device or the user computing device.

In certain embodiments, the CM computing device generates a configuration file to transmit the translated text strings. The configuration file includes locale identifiers associated with the translated text strings to enable the app to identify what locale corresponds to each of the translated text strings. In at least some embodiments, the configuration file also includes label identifiers received from the app developer device to enable the app to identify where to insert each translated text string within the app.

The CM computing device may send the configuration file associated with the app to be cached by the app developer device and/or the user computing device. If a user of the app changes a locale of the app from a default locale, caching the configuration file enables the app to identify and provide a translation of the text strings within the app to the user automatically after the new locale is selected. The translated text strings are added to the sections of the app based on the label identifiers of the configuration file. In some implementations, the app developer device or the user computing device may request a portion of the translated text strings from the CM computing device. For example, the app developer device or the user computing device may request translated text strings for a specific section of the app based on a label identifier.

In one example, an app developer of a mobile app determines that the app requires translation and localization services for ten locales. The app includes four user interfaces with text strings. In the example, the CM computing device does not include a setup profile associated with the app (i.e., the app has not been setup with the CM computing device). Therefore, the app begins a setup phase with the CM computing device to receive translations for the ten locales. The app developer, via an app developer device, transmits the text strings of the app (i.e., input text strings) and locale identifiers for each of the ten locales to the CM computing device. The app developer further transmits an app identifier and label identifiers that correspond with the location of the text strings within the app. The CM computing device converts the text strings from the app (i.e., input text strings) into input text tokens. The CM computing device then compares the input text tokens and the input locale identifiers to the entries of the localization table. In the example, the CM computing device identifies a matching entry for each input text token and input locale identifier. The CM computing device generates a setup profile of the app that includes the matching entries with translated text strings. In the example, the app developer may configure the setup profile such that the CM computing device generates and transmits a configuration file including the translated text strings to user computing devices running the app each time the user computing devices start the app for caching.

Figure 1:
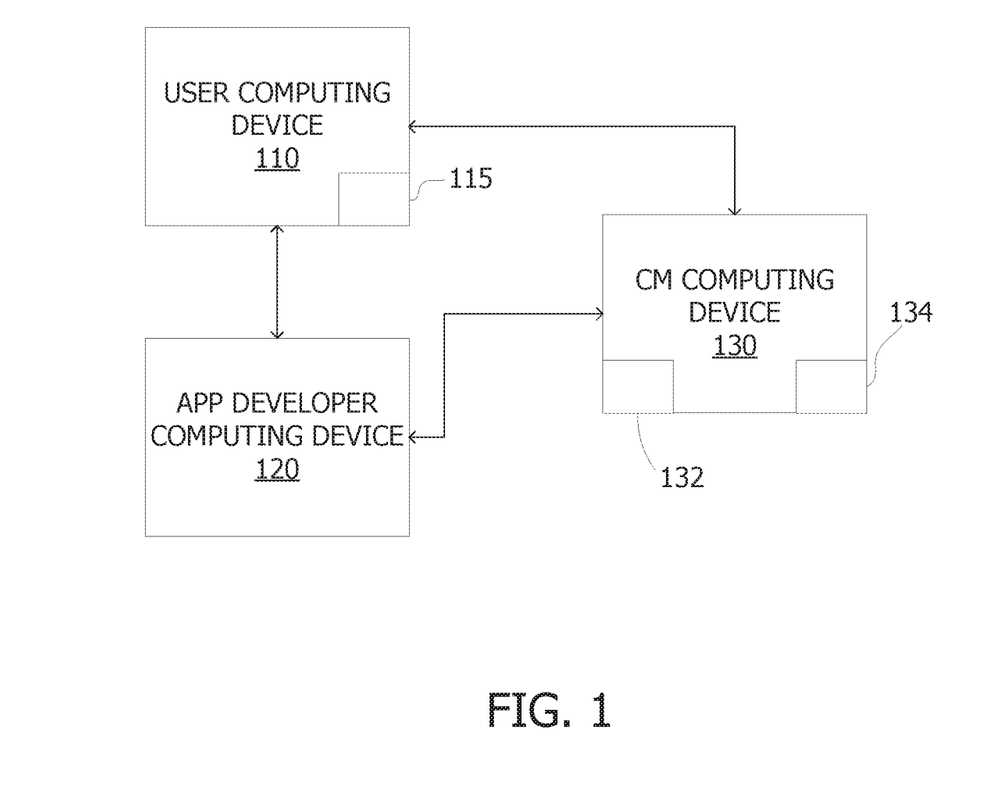
FIG. 1 is an example language conversion system for providing translations for software applications.

FIG. 1 depicts an example language conversion system 100 for providing translations in apps. In the illustrated embodiment, system 100 includes a user computing device 110, an app developer device 120, and a CM computing device 130. In other embodiments, system 100 may include additional, fewer, or alternative components and functionality for providing translations, including those described elsewhere herein.

In the example embodiment, user computing device 110 is a personal computer such as a desktop, laptop, tablet, mobile device, smartphone associated with a user. In at least some embodiments, system 100 includes a plurality of user computing devices. The user computing device 110 stores an app 115 associated with an app developer.

In the example embodiment, app 115 includes one or more user interfaces (not shown) that include at least one text string. The text strings include, for example, greetings, instructions, labels, and other text-based information that enable the user to understand the functionality of app 115 and the data presented by app 115. In at least some embodiments, app 115 includes label identifiers that indicate a section or location of app 115. A section may include, for example, a user interface, a page, a text box, a label, a heading, and other areas of an app that may include text. For example, a label identifier may indicate that a text string for greeting the user is located at the top of an initial or default user interface. The text strings can be edited, replaced, or removed by the app developer during development and maintenance. For example, the text strings may be replaced with translated text strings associated with different locales. Providing translations or localizations of the text strings enables the app developer to distribute app 115 to users from the different locales.

App developer device 120 is a computing device associated with the app developer that develops and maintains app 115. In some embodiments, app developer device 120 may be a plurality of computing devices associated with the app developer or with many different app developers. App developer device 120 is in communication with user computing device 110 to transmit and receive data associated with app 115. In other embodiments, system 100 may include a plurality of app developer devices 120. Additionally or alternatively, app developer device 120 is associated with a plurality of apps 115.

In the example embodiment, app developer device 120 is configured to send one or more input text strings and a plurality of locale identifiers to CM computing device 130, and in return, receives translated text strings associated with the input text strings. The input text strings are text strings used by the app developer to develop app 115. The translated text strings enable users from different locales to understand the functionality of app 115 and the data presented by app 115 without requiring the users to understand the input text strings.

CM computing device 130 includes a processor 132 and a memory device 134 in communication with processor 132. In some embodiments, CM computing device 130 may be a plurality of computing devices in communication with each other. CM computing device 130 is configured to store a plurality of translated text strings. In some embodiments, CM computing device 130 is in communication with a database (not shown in FIG. 1) that stores translated text strings. In certain embodiments, the translated text strings may be provided to CM computing device 130 by app developer device 120, an operator of CM computing device 130, or another computing device in communication with CM computing device 130.

CM computing device 130 is in communication with app developer device 120. In the illustrated embodiment, CM computing device is further in communication with user computing device 110. CM computing device 130 is configured to receive one or more input text strings from app developer device 120 and identify translated text strings associated with the input text strings. When the translated text strings are identified, user computing device 110 and/or app developer device 120 requests or retrieves the translated text strings from CM computing device 130. CM computing device 130 enables the app developer to develop app 115 for a plurality of locales without requiring knowledge of the locale or language. In addition, a plurality of app developer devices 120 may access the stored translated text strings in CM computing device 130 to prevent redundant translations.

In the example embodiment, CM computing device 130 is configured to receive the input text strings and a plurality of input locale identifiers from app developer device 120. As used herein, "input" refer to text strings, text tokens, and locale identifiers that originate from user computing device 110 or app developer device 120 for translation. CM computing device 130 also receives an app identifier associated with app developer device 120. The app identifier enables CM computing device 130 to identify which app or app developer device is associated with the input text strings and the input locale identifiers. In some embodiments, app developer device 120 transmits a batch file including the input text strings and the locale identifiers to CM computing device 130. In at least some embodiments, CM computing device 130 receives one or more label identifiers associated with the input text strings.

In some implementations, the input text strings may include a unit of measurement or a currency label (e.g., dollar, euro, peso, etc.). CM computing device 130 may be configured to detect the unit of measurement (e.g., temperature) or the currency label. If CM computing device 130 is providing translations in locales that do not use the original unit of measurement or currency, data displayed by app 115 such as temperature, speed, and currency may be misrepresented with a different label. The CM computing device may notify app developer device 120 and/or user computing device 110 of the change such that the app may reflect the changing label.

The CM computing device is further configured to convert the input text strings into input text tokens. The input text tokens enable CM computing device 130 to store the input text strings in a searchable, universal format. By using a universal format, CM computing device 130 identifies translated text strings stored in CM computing device 130 that are associated with the input text strings without knowledge of the language or locale of the translated text strings. In the example embodiment, CM computing device 130 compares the input text strings to a table of text tokens to identify an input text token associated with each input text string. In other embodiments, CM computing device 130 may convert the input text strings into input text tokens using a different technique such as an algorithm. Alternatively, CM computing device 130 may receive input text tokens from app developer device 120. In such embodiments, CM computing device 130 may proceed to analyze the input text tokens and input locale identifiers without converting.

In some implementations, converting the input text strings into input text tokens may result in text tokens identical to the text strings. In one example, the input text tokens may include English alphabetical characters and numerical values for special characters, e.g., "$" and "%" may be represented by "1" and "2". In the example, if an input text string includes only English alphabetical characters, the input text token is the same as the input text string. After CM computing device 130 has converted the input text strings into input text tokens, CM computing device 130 stores the input text tokens.

CM computing device 130 is also configured to compare the input text tokens and the input locale identifiers to text tokens and locale identifiers stored in CM computing device 130. Each stored text token is associated with at least one translated text string. Each translated text string associated with the stored text token is a translation for a different locale. Accordingly, each translated text string is also associated with a stored locale identifier. When an input text token and an associated input locale identifier match a text token and an associated locale identifier stored in CM computing device 130, the match indicates that a translated text string associated with the input text token and the input locale identifier is stored in CM computing device 130.

CM computing device 130 identifies any matching pairs of text tokens and associated locale identifiers to locate corresponding translated text strings. CM computing device 130 associates the translated text strings with app 115. If an input text token and input locale identifier do not match, CM computing device 130 may not store a corresponding translated text string. In some embodiments, CM computing device 130 may notify app developer device 120 that the input text token and input locale identifier do not match.

Once the translated text strings have been associated with app 115, user computing device 110 and/or app developer device 120 request or retrieve the translated text strings from CM computing device 130 to be added to app 115. App developer device 120 may store the translated text strings and provide user computing device 110 access to the translated text strings through app 115. In the example embodiment, CM computing device 130 is configured to not require user computing device 110 or app developer device 120 to submit the input text strings and input locale identifiers each time to retrieve the translated text strings. CM computing device 130 is configured to identify user computing device 110 or app developer device 120 and transmit the translated text strings associated with app 115. In the example embodiment, CM computing device 130 also transmits a corresponding locale identifier for each translated text string to identify a locale associated with each translated text string.

In certain embodiments, CM computing device 130 is configured to generate a configuration file that includes the translated text strings, the locale identifiers, and/or the label identifiers associated with app 115. The configuration file enables app 115 to identify which locales and what sections of app 115 are associated with the translated text strings. In some embodiments, the configuration file may include additional data, such as text tokens associated with the translated text strings. Alternatively, the configuration file may be generated by user computing device 110 and/or app developer device 120 using translated text strings, locale identifiers, and/or label identifiers from CM computing device 130.

User computing device 110 retrieves the translated text strings for app 115 from app developer device 120 and/or CM computing device 130. In the example embodiment, the translated text strings are stored or cached at user computing device 110 prior to the user changing locales in app 115. In one embodiment, user computing device 110 stores the configuration file. In certain embodiments, app 115 may automatically identify a locale associated with the user based on, for example, information provided by the user or location information from user computing device 110. In other embodiments, the user selects a locale from within app 115.

When switching locales within app 115, user computing device 110 performs a lookup within the configuration file for a locale identifier associated with the new locale. Text strings associated with the previous locale (e.g., the input text strings) are replaced with corresponding translated text strings associated with the new locale. For example, app 115 may be switched from an "English-United States" locale to a "French-Canada" locale. Text strings in English are replaced by translated text strings in French with similar meanings (e.g., "hello" is replaced by "bonjour") from the configuration file. Storing the translated text strings at user computing device 110 before the locale of app 115 is changed facilitates reducing time taken to change locales.

Figure 2:
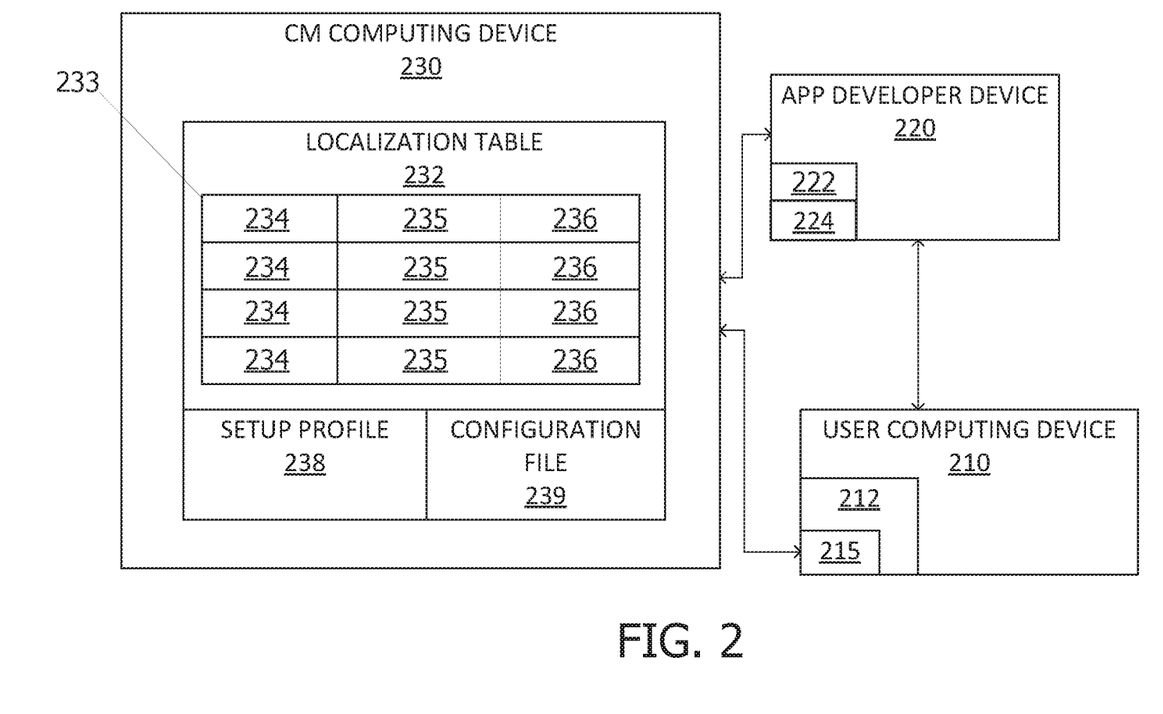
FIG. 2 is an example conversion management (CM) device used in a language conversion system, such as the system shown in FIG. 1.

FIG. 2 is an exemplary CM computing device 230 used in a language conversion system, such as system 100 shown in FIG. 1. CM computing device 230 is in communication with a user computing device 210 and an app developer device 220.

User computing device 210 includes a memory device 212 that stores an app 215 associated with app developer device 220. App 215 uses a plurality of input text strings 222 to provide information to a user of app 215. App developer device 220 is configured to store input text strings 222 and a plurality of locale identifier 224 associated with input text strings 222. To provide translations of input text strings 222 within app 215, app developer device 220 transmits input text strings 222 and input locale identifiers 224 to CM computing device 230. In the example embodiment, app developer device 220 has not previously communicated with CM computing device 230 about app 215. CM computing device 230 is configured to include a "setup phase" for app developer device 220 as described herein.

CM computing device 230 receives input text strings 222 and input locale identifiers 224. In the example embodiment, CM computing device 230 also receives an app identifier and one or more label identifiers (both not shown) associated with input text strings 222.

In the example embodiment, CM computing device 230 stores a localization table 232. Localization table 232 stores a plurality of entries 233. Each entry 233 includes a stored text token 234, a stored locale identifier 235, and a translated text string 236 associated with each other. For example, an entry 233 may include a stored text token 234 representing "Hello", a stored locale identifier representing "French-France", and a translated text string 236 representing "Bonjour". In some embodiments, entries 233 may include additional information such as language data, locale data, time & date data, app identifiers, and/or label identifiers. CM computing device 230 is configured to add, edit, update, and remove entries 233 from localization table 232. In some embodiments, CM computing device 230 may receive information to update localization table 232. For example, CM computing device 230 may receive new translated text strings 236 to be added to localization table 232.

CM computing device 230 is configured to convert input text strings 222 into input text tokens using a table of text tokens. CM computing device 230 is configured to compare the input text tokens and input locale identifiers 224 to entries 233 of localization table 232. In the example embodiment, CM computing device 230 pairs each input text token with each input locale identifier 224 and scans localization table 232 for one entry 233 (referred to herein as a "matching entry") that includes a matching stored text token 234 and a matching stored locale identifier 235. The matching entry includes a translated text string 236 associated with at least one input text string 222 from app developer device 220. CM computing device 230 identifies any additional matching entries for each input text token and each input locale identifier 224.

CM computing device 230 is configured to generate and store a setup profile 238 associated with app 215. In at least some embodiments, CM computing device 230 is configured to store a plurality of setup profiles 238 for a plurality of apps. Setup profile 238 includes at least a portion of the matching entries from localization table 232, including stored locale identifiers 235 and translated text strings 236. In other embodiments, setup profile 238 identifies translated text strings 236 stored in localization 232 associated with app 215. Setup profile 238 also includes the app identifier and any label identifiers associated with app 215. In certain embodiments, setup profile 238 may include text strings, text tokens, locale identifiers, and/or other data associated with translated text strings 236 for identifying each translated text string 236.

Setup profile 238 is configured to enable user computing device 210 and app developer device 220 to retrieve translated text strings 236 without requiring input text strings 222 and input locale identifiers 224 to be submitted each time. CM computing device 230 is configured to detect user computing device 210 and app developer device 220 are requesting or retrieving translated text strings 236. In some embodiments, CM computing device 230 provides translated text strings 236 based on setup profile 238. In certain embodiments, user computing device 210 or app developer device 220 indicates one or more label identifiers from setup profile 238 to retrieve translated text strings 236 associated with the indicated label identifiers. CM computing device 230 may be configured to identify and provide translated text strings 236 associated with app 215 and the indicated label identifiers.

Setup profile 238 is configured to provide updated translated text strings 236 to user computing device 210 and app developer device 220. For example, CM computing device 230 may update an entry 233 including a translated text string 236 associated with setup profile 238. CM computing device 230 edits setup profile 238 with the updated information. In other embodiments, setup profile 238 indicates or identifies translated text strings 236 within localization table 232 and therefore provides the updated information from localization 232 automatically. In some embodiments, app developer device 220 may edit or update setup profile 238 in response to changes in app 215.

In the illustrated embodiment, CM computing device 230 is further configured to generate a configuration file 239 based on setup profile 238. Configuration file 239 includes any translated text strings associated with app 215. Configuration file 239 further includes locale identifiers for each translated text string and/or label identifiers from app 215. Configuration file 239 is transmitted to or retrieved by user computing device 210 and/or app developer device 220 for storage. Configuration file 239 enables user computing device 210 and app developer device 220 to identify a locale and a section of app 215 associated with each translated text string.

When a locale of app 215 is changed to a new locale, user computing device 210 identifies any translated text strings in configuration file 239 that are associated with the new locale. The translated text strings are inserted into the sections of app 215 based on the label identifiers of configuration file 239. The text strings previously in the sections (e.g., input text strings 222) may be replaced by the translated text strings.

Table 1 represents information that may be included within an example configuration file. In some embodiments, the configuration file may include other information. The configuration file includes information from the setup profile (e.g., setup profile 238). When the configuration file is stored at a user computing device, changing a locale of an app associated with the configuration file causes the user computing device to perform a lookup through the configuration file for a locale identifier associated with the new locale. The user computing device then inserts the translated text strings associated with the locale identifier into the app at a location within the app specified by a corresponding label identifier. In the example embodiment, the user computing device replaces the text previously at the location within app.

For example, if the locale is switched from "English-United States" to "Mexico-Spanish", the user computing device examines the configuration file in Table 1 and identifies two locale identifiers that are associated with the new locale. The user computing device inserts the translated text strings ("Hola" and "Nuevoes Mensajes") within the app. In the example embodiment, "Hola" is inserted at a location identified as "<Header>" and "Nuevoes Mensajes" is inserted at a location identified as "<Email Notification>". The translated text strings replace the previous text strings ("Hello" and "New Messages") when the app is displayed on the user computing device.

TABLE 1

| Input Text String | Label Identifier | Locale Identifier | Translated Text String |
|---|---|---|---|
| Hello | <Header> | Spanish-Mexico | Hola |
| Hello | <Header> | Italian-Italy | Ciao |
| New Messages | <Email Notification> | Spanish-Mexico | Nuevos Mensajes |
| Inbox | <Email Header> | German-Germany | Posteingang |

Figure 3:
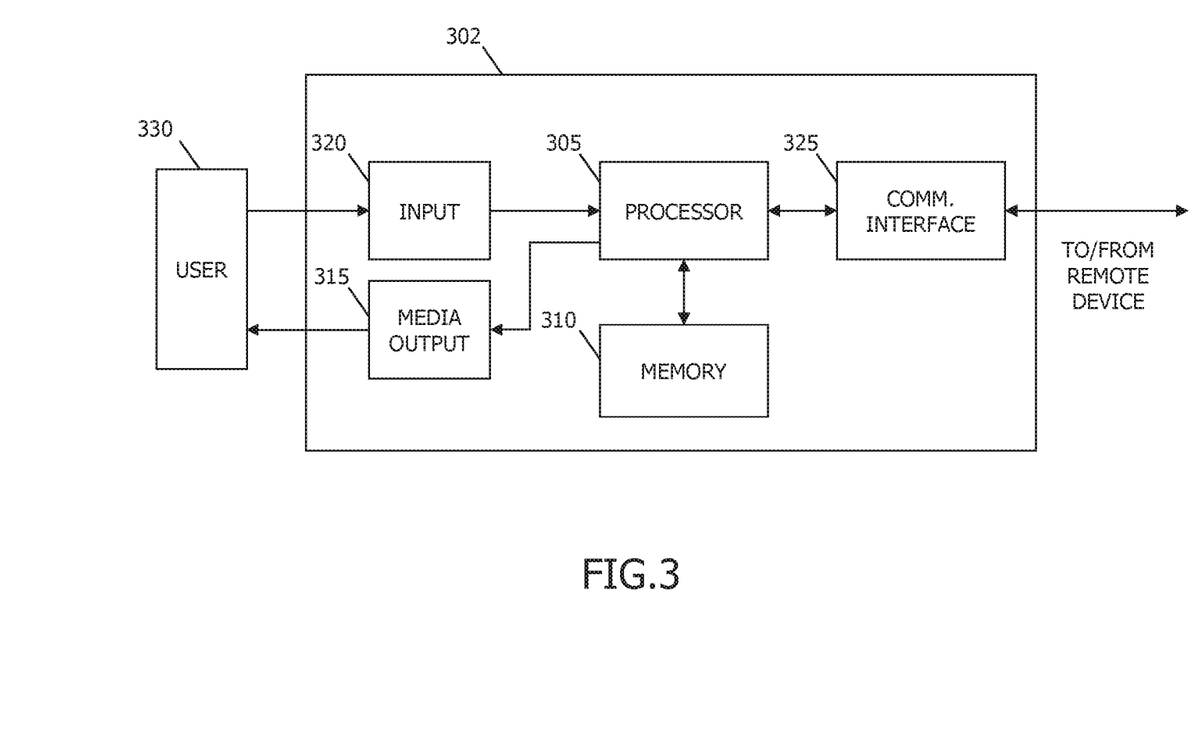
FIG. 3 is an example user or remote computing device used in a language conversion system, such as the system shown in FIG. 1.

FIG. 3 depicts an exemplary configuration of a user or remote computing device 302. Computing device 302 may include, but is not limited to, user computing device 110, app developer device 120, and/or CM computing device 130 shown in FIG. 1. Computing device 302 may also include, computing device 210, app developer device 220, and/or CM computing device 230 shown in FIG. 2.

Computing device 302 includes a processor 305 for executing instructions. In some embodiments, executable instructions may be stored in a memory area 310. Processor 305 includes one or more processing units (e.g., in a multi-core configuration). Memory area 310 may be any device allowing information such as executable instructions and/or other data to be stored and retrieved. Memory area 310 may include one or more computer-readable media.

Computing device 302 includes at least one media output component 315 for presenting information to a user 330. Media output component 315 may be any component capable of conveying information to user 330. In some embodiments, media output component 315 may include an output adapter, such as a video adapter and/or an audio adapter. An output adapter is operatively coupled to processor 305 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 315 may be configured to present an interactive user interface (e.g., a web browser or client application) to user 330.

In some embodiments, computing device 302 may include an input device 320 for receiving input from user 330. Input device 320 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 315 and input device 320.

Computing device 302 also includes a communication interface 325, which may be communicatively coupleable to a remote device such as app developer device 120 (shown in FIG. 1). Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 310 are, for example, computer-readable instructions for providing a user interface to user 330 via media output component 315 and, optionally, receiving and processing input from input device 320. A user interface may include, among other possibilities, a web browser and client application. Web browsers enable users 330 to display and interact with media and other information typically embedded on a web page or a website from a web server associated with a merchant. A client application allows users 330 to interact with a server application associated with, for example, a vendor or business.

Figure 4:
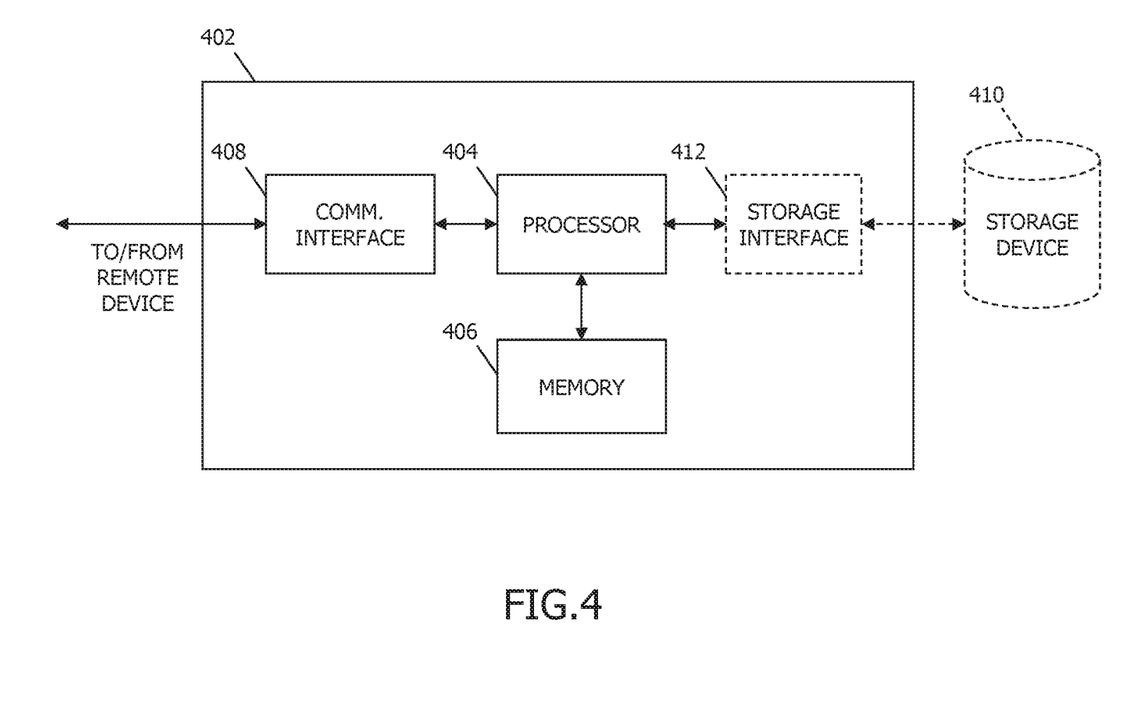
FIG. 4 is an example host computing device used in a language conversion system, such as the system shown in FIG. 1.

FIG. 4 depicts an exemplary configuration of a host computing device 402. Host computing device 402 may be representative of user computing device 110, app developer device 120, and/or CM computing device 130 shown in FIG. 1. Host computing device 402 may also be representative of computing device 210, app developer device 220, and/or CM computing device 230 shown in FIG. 2. In some embodiments, host computing device 402 is a remote computing device relative to other computing devices. Host computing device 402 includes a processor 404 for executing instructions. Instructions may be stored in a memory area 406, for example. Processor 404 may include one or more processing units (e.g., in a multi-core configuration).

Processor 404 is operatively coupled to a communication interface 408 such that host computing device 402 is capable of communicating with a remote device such as user computing device 302 shown in FIG. 3 or another host computing device 402. For example, communication interface 408 may receive requests from user computing device 302 via the Internet.

Processor 404 is also operatively coupled to a storage device 410. Storage device 410 may be any computer-operated hardware suitable for storing and/or retrieving data. In some embodiments, storage device 410 may be integrated in host computing device 402. For example, host computing device 402 may include one or more hard disk drives as storage device 410. In other embodiments, storage device 410 may be external to host computing device 402 and may be accessed by a plurality of host computing devices 402. For example, storage device 410 may include multiple storage units such as hard disks or solid state disks in a redundant array of inexpensive disks (RAID) configuration. Storage device 410 may include a storage area network (SAN) and/or a network attached storage (NAS) system.

In some embodiments, processor 404 may be operatively coupled to storage device 410 via a storage interface 412. Storage interface 412 may be any component capable of providing processor 404 with access to storage device 410. Storage interface 412 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 404 with access to storage device 410.

Memory areas 310 (shown in FIG. 3) and 406 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 5:
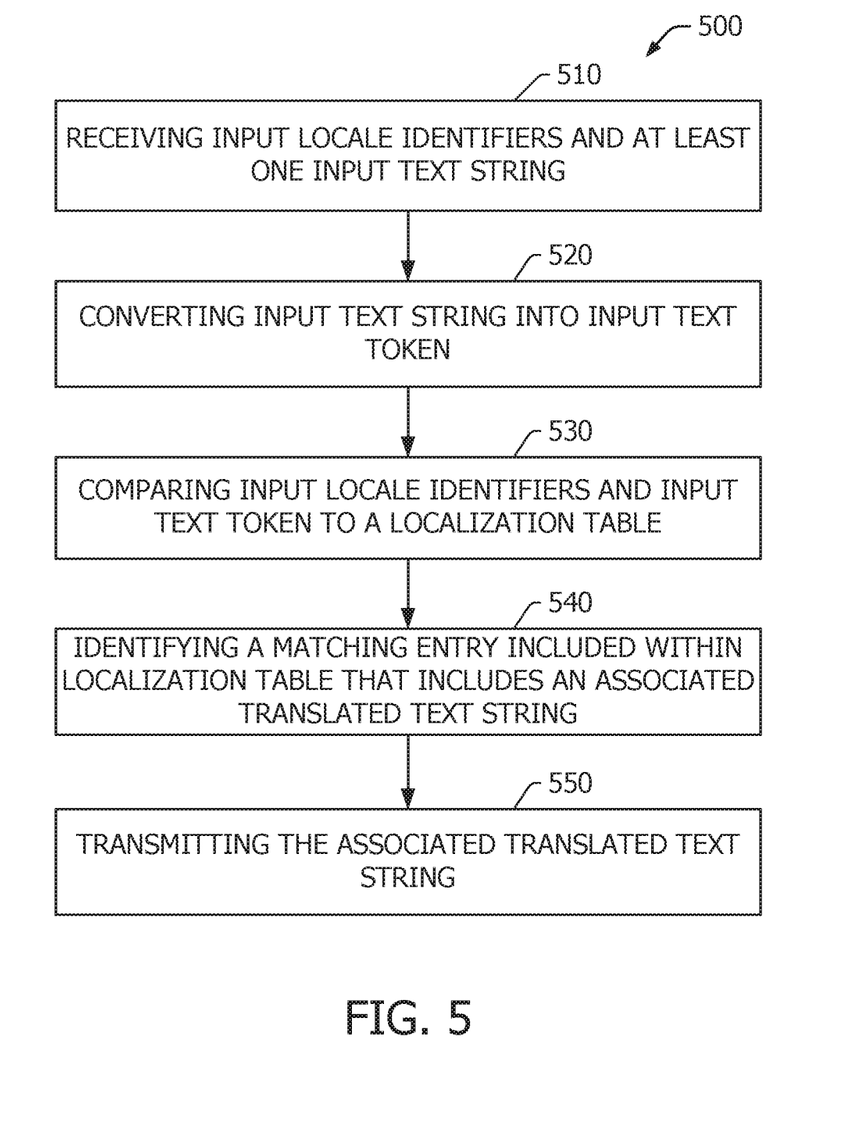
FIG. 5 is a diagram of an example method for providing language conversion services to software applications using a language conversion system, such as the system shown in FIG. 1.

FIG. 5 is a diagram of an example method 500 for providing language conversion services to software applications using a CM computing device such as CM computing devices 130, 230 (shown in FIGS. 1 and 2, respectively). It is to be understood that method 500 may include additional, fewer, or alternative steps for providing language conversion services to software applications, including those described elsewhere herein.

In the example embodiment, the CM computing device receives 510 one or more input locale identifiers and at least one input text string from an app developer device. The CM computing device converts 520 the input text strings into input text tokens for further analysis. The CM computing device compares 530 the input locale identifiers and the input text tokens to a localization table. The localization table has one or more entries including a text token, a locale identifier, and a translated text string.

The CM computing device compares 530 the input locale identifiers and the input text tokens to each entry of the localization table. The CM computing device identifies 540 a matching entry for at least one pair of the input locale identifiers and the input text tokens. The matching entry includes a translated text string that is associated with an input text string from the app developer device. In some embodiments, the CM computing device generates or updates a setup profile including the translated text strings for the app developer device or an app associated with the input text strings. The CM computing device transmits 550 the translated text strings associated with the input text strings to the app developer device and/or a user computing device that includes the app. In some embodiments, the app developer device or the user computing device may request or retrieve the translated text strings. The setup profile enables the CM computing device to access and transmit 550 the translated text strings associated with the input text strings without converting 520, comparing 530, and identifying 540 each time the translated text strings are requested. In at least some embodiments, the CM computing device generates a configuration file including the translated text strings based on the setup profile. In such embodiments, the CM computing device transmits 550 the configuration file for use with the app.

Figure 6:
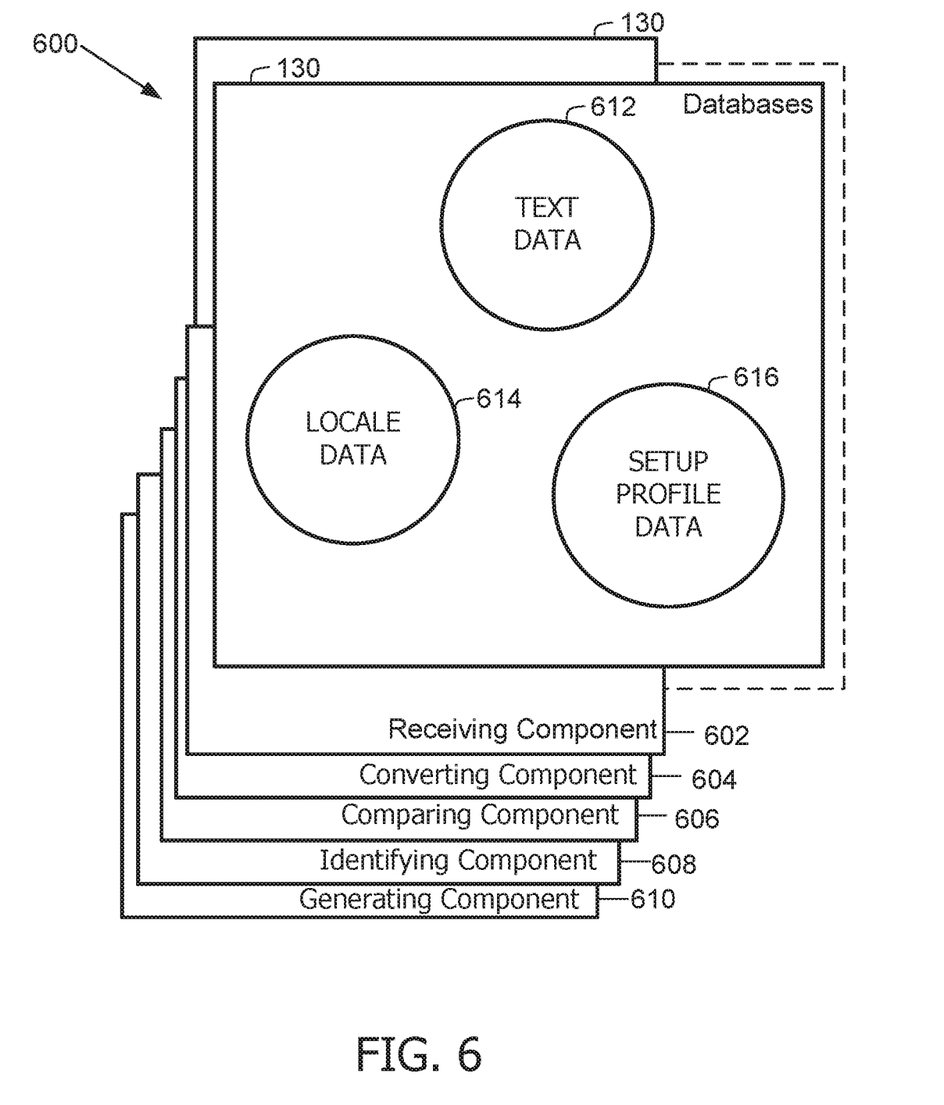
FIG. 6 is a diagram of components of an example CM computing device that may be used in a language conversion system, such as the system shown in FIG. 1.

FIG. 6 is a diagram 600 of components of an example CM computing device 130 (shown in FIG. 1) that may be used in the environment shown in FIG. 5. FIG. 6 further depicts a configuration of databases including at least a database 640. Database 640 is coupled to several components within CM computing device 130, which perform specific tasks.

In the example embodiment, CM computing device 130 includes a receiving component 602 configured to receive one or more input locale identifiers and at least one input text string from an app developer device. CM computing device 130 also includes a converting component 604 configured to convert the input text strings into input text tokens. CM computing device 130 further includes a comparing component 606 configured to compare the input locale identifiers and the input text tokens to a localization table. In the example embodiment, CM computing device 130 includes an identifying component 608 configured to identify a matching entry included within the localization table. In the illustrated embodiment, CM computing device 130 also includes a generating component 610 configured to generate a setup profile for an app. The setup profile includes translated text strings associated with the app to be sent to or retrieved by an app developer device or a user computing device running the app. In some embodiments, generating component 610 also generates a configuration file.

In an exemplary embodiment, database 640 stores different types of data, including, but not limited to, text data 612, locale data 614, and setup profile data 616. Text data 612 may include, for example, text strings, text tokens, translated text strings, and other data related to text strings and text tokens. Locale data 614 includes locale identifiers and information associated with locales. Setup profile data 616 may include one or more setup profiles for app developer devices in communication with CM computing device 130. Database 640 is configured to retrieve, transmit, and update each type of data as required.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A conversion management (CM) computing device including a processor in communication with a memory, said processor configured to:
   receive, from a developer computing device, an application identifier associated with a computer application and a plurality of input text strings from the computer application;
   convert the plurality of input text strings into a plurality of input text tokens;
   store a setup profile including the application identifier and the plurality of input text tokens;
   receive a locale request, from a user computing device, including the application identifier and a locale identifier, the locale identifier identifying a language of use for the computer application;
   identify a matching entry included within a localization table for each of the plurality of input text tokens, wherein each matching entry includes a stored text token matching the respective input text token, a stored locale identifier matching the locale identifer, and an associated translated text string;
   generate a configuration file including the application identifier, the matched locale identifier, and the associated translated text strings for each of the plurality of input text tokens; and
   transmit the configuration file to the user computing device.

2. The CM computing device of claim 1, wherein the setup profile further includes a label identifier associated with each of the input text tokens, the label identifier identifying a location within the computer application where the input text string is located.

3. The CM computing device of claim 2, wherein the locale request includes a plurality of label identifiers, each of the label identifiers of the plurality of label identifiers identifying a label of the respective location within the computer application, and said processor further configured to:
   translate the plurality of label identifiers and associated input text tokens, based on the identified matching entry for each of the input text tokens.

4. The CM computing device of claim 1, wherein the configuration file is configured to automatically replace the input text string with the associated translated text string at the identified location within the computer application using a label identifier.

5. The CM computing device of claim 1 said processor further configured to transmit the configuration file to the developer computing device for storage within the developer computing device, wherein the configuration file is accessible by the user computing device when the computer application is configured on the user computing device.

6. The CM computing device of claim 1, said processor further configured to:
   determine no matching entry is included in the localization table; and
   alert the developer computing device.

7. The CM computing device of claim 1, wherein the plurality of input text strings includes at least one of a measurement text string and a currency text string, and said processor configured to:
   translate at least one of the measurement text string and the currency text string, based on the identified matching entry for each of the input text tokens.

8. A computer-implemented method for identifying a translated text string, the method implemented by a conversion management (CM) computing device in communication with a memory, the method comprising:
   receiving, from a developer computing device, an application identifier associated with a computer application and a plurality of input text strings from the computer application;
   converting the plurality of input text strings into a plurality of input text tokens;
   storing a setup profile including the application identifier and the plurality of input text tokens;
   receiving a locale request, from a user computing device, including the application identifier and a locale identifier, the locale identifier identifying a language of use for the computer application;
   identifying a matching entry included within a localization table for each of the plurality of input text tokens, each matching entry includes a stored text token matching the respective input text token, a stored locale identifier matching the locale identifier, and an associated translated text string;
   generating a configuration file including the application identifier, the matched locale identifier, and the associated translated text strings for each of the plurality of input text tokens; and
   pitting the configuration file to the user computing device.

9. The computer-implemented method of claim 8, wherein the setup profile further includes a label identifier associated with each of the input text tokens, the label identifier identifying a location within the computer application where the input text string is located.

10. The computer-implemented method of claim 9, wherein the locale request includes a plurality of label identifiers, each of the label identifiers of the plurality of label identifiers identifying a label of the respective location within the computer application, and the method further comprising:
    translating the plurality of label identifiers and associated input text tokens, based on the identified matching entry for each of the input text tokens.

11. The computer-implemented method of claim 8 wherein the configuration file is configured to automatically replace the input text string with the associated translated text string at the identified location within the computer application using a label identifier.

12. The computer-implemented method of claim 8 further comprising transmitting the configuration file to the developer computing device for storage within the developer computing device, wherein the configuration file is accessible by the user computing device when the computer application is configured on the user computing device.

13. The computer-implemented method of claim 8 further comprising:
   determining no matching entry is included in the localization table; and
   alerting the developer computing device.

14. The computer-implemented method of claim 8, wherein the plurality of input text strings includes at least one of a measurement text string and a currency text string, and the method further comprising:
   translating at least one of the measurement text string and the currency text string, based on the identified matching entry for each of the input text tokens.

15. Computer-readable storage media for identifying a translated text string, the computer-readable storage media having computer-executable instructions embodied thereon, wherein, when executed by at least one processor, the computer-executable instructions cause the processor to:
   receive, from a developer computing device, an application identifier associated with a computer application and a plurality of input text strings from the computer application;
   convert the plurality of input text strings into a plurality of input text tokens;
   store a setup profile including the application identifier and the plurality of input text tokens;
   receive a locale request, from a user computing device, including the application identifier and a locale identifier, the locale identifier identifying a language of use for the computer application;
   identify a matching entry included within a localization table for each of the plurality of input text tokens, wherein each matching entry includes a stored text token matching the respective input text token, a stored locale identifier matching the locale identifier, and an associated translated text string;
   generate a configuration file including the application identifier, the matched locale identifier, and the associated translated text strings for each of the plurality of input text tokens; and
   transmit the configuration file to the user computing device.

16. The computer-readable storage media of claim 15, wherein the the setup profile further includes a label identifier associated with each of the input text tokens, the label identifier identifying a location within the computer application where the input text string is located.

17. The computer-readable storage media of claim 16, wherein the locale request includes a plurality of label identifiers, each of the label identifiers of the plurality of label identifiers identifying a label of the respective location within the computer application, and the computer-executable instructions further cause the processor to:
   translate the plurality of label identifiers and associated input text tokens, based on the identified matching entry for each of the input text tokens.

18. The computer-readable storage media of claim 15, wherein the wherein the configuration file is configured to automatically replace the input text string with the associated translated text string at the identified location within the computer application using a label identifier.

19. The computer-readable storage media of claim 15, wherein the computer-executable instructions further cause the processor to:
   transmit the configuration file to the developer computing device for storage within the developer computing device, wherein the configuration file is accessible by the user computing device when the computer application is configured on the user computing device.

20. The computer-readable storage media of claim 15, wherein the plurality of input text strings includes at least one of a measurement text string and a currency text string, and the computer-executable instructions further cause the processor to:
   translate at least one of the measurement text string and the currency text string, based on the identified matching entry for each of the input text tokens.

* * * * *

UNITED STATES PATENT AND TRADEMARK OFFICE
CERTIFICATE OF CORRECTION

PATENT NO. : 10,102,202 B2
APPLICATION NO. : 14/973422
DATED : October 16, 2018
INVENTOR(S) : Bridget Kay Huck et al.

It is certified that error appears in the above-identified patent and that said Letters Patent is hereby corrected as shown below:

In the Claims

In Claim 1, Column 15, Line 37, delete "locale identifer" and insert therefor -- locale identifier --.
In Claim 8, Column 16, Line 42, delete "pitting the configuration" and insert therefor
-- transmitting the configuration --.

Signed and Sealed this
Nineteenth Day of November, 2019

Andrei Iancu
*Director of the United States Patent and Trademark Office*